United States Patent
Li et al.

(10) Patent No.: US 9,313,026 B2
(45) Date of Patent: Apr. 12, 2016

(54) KEY NEGOTIATION METHOD AND APPARATUS ACCORDING TO SM2 KEY EXCHANGE PROTOCOL

(71) Applicant: China IWNCOMM Co., Ltd., Shaanxi (CN)

(72) Inventors: Zhiyong Li, Shaanxi (CN); Xiang Yan, Shaanxi (CN)

(73) Assignee: CHINA IWNCOMM CO., LTD. (CN)

( * ) Notice: Subject to any disclaimer, the term of this patent is extended or adjusted under 35 U.S.C. 154(b) by 113 days.

(21) Appl. No.: 14/361,750

(22) PCT Filed: Nov. 26, 2012

(86) PCT No.: PCT/CN2012/085233
§ 371 (c)(1),
(2) Date: May 30, 2014

(87) PCT Pub. No.: WO2013/078970
PCT Pub. Date: Jun. 6, 2013

(65) Prior Publication Data
US 2015/0124970 A1     May 7, 2015

(30) Foreign Application Priority Data
Nov. 30, 2011    (CN) .......................... 2011 1 0390564

(51) Int. Cl.
*H04L 9/08* (2006.01)
*H04L 9/30* (2006.01)
*H04L 9/14* (2006.01)

(52) U.S. Cl.
CPC ............ *H04L 9/0819* (2013.01); *H04L 9/0869* (2013.01); *H04L 9/14* (2013.01); *H04L 9/3033* (2013.01); *H04L 9/3066* (2013.01); *H04L 2209/24* (2013.01)

(58) Field of Classification Search
CPC .................................................. H04L 63/0428
USPC ....................................................... 380/255
See application file for complete search history.

(56) References Cited

U.S. PATENT DOCUMENTS

2006/0285682 A1    12/2006   Sarangarajan et al.

FOREIGN PATENT DOCUMENTS

| CN | 1831754 A | 9/2006 |
|---|---|---|
| CN | 101291214 A | 10/2008 |
| CN | 102111681 A | 6/2011 |
| CN | 102412971 A | 4/2012 |

OTHER PUBLICATIONS

Supplementary European Search Report dated Sep. 1, 2015 of corresponding European Application No. 12852494.9.
Xu, J., et al., "Comments on the SM2 Key Exchange Protocol," *Cryptology and Network Security*, Dec. 10, 2011, pp. 160-171.

*Primary Examiner* — Christopher Brown
(74) *Attorney, Agent, or Firm* — DLA Piper LLP (US)

(57) ABSTRACT

The invention relates to the technical field of information, and disclosed in the present invention are a key negotiation method and apparatus according to the SM2 key exchange protocol. The method is implemented as follows: two negotiation parties both calculate a parameter W according to the minimum positive integer value in the permissible values of X which enable an inequality $n \leq 2^X$ to hold, and perform key negotiation with the opposite negotiation party according to the parameter W. Compared with a method for calculating the parameter W through calculating log 2 (n) logarithmic value firstly and then rounding up the logarithmic value, the method disclosed by the invention has the advantages that the calculated amount is effectively reduced, and the implementation complexity of an algorithm is reduced, thereby greatly improving the implementation efficiency of the key negotiation process based on the SM2 key exchange protocol, and then optimizing the engineering implementation of the SM2 key exchange protocol.

16 Claims, 4 Drawing Sheets

KEY NEGOTIATION METHOD AND APPARATUS ACCORDING TO SM2 KEY EXCHANGE PROTOCOL

This application is a US National Stage of International Application No. PCT/CN2012085233, filed on 26 Nov. 2012, designating the United States, and claiming priority from Chinese Patent Application No. 201110390564.7, filed with the Chinese Patent Office on Nov. 30, 2011 and entitled "KEY NEGOTIATION METHOD AND APPARATUS ACCORDING TO SM2 KEY EXCHANGE PROTOCOL", which is incorporated herein by reference in its entirety.

FIELD OF THE INVENTION

The present invention relates to the technical field of information, and in particular to a key negotiation method and apparatus according to the SM2 key exchange protocol.

BACKGROUND OF THE INVENTION

The China State Encryption Administration proclaimed SM2 and SM3 cryptographic algorithms in December, 2010, marking the moment that the SM2 and SM3 cryptographic algorithms enter a commercial phase. As a component of the SM2 cryptographic algorithm, the SM2 key exchange protocol is applied well in the functional fields of key administration and key negotiation. In the process of implementing SM2 key exchange protocol engineering, the parameter W is an important parameter in the key exchange protocol, and the generating operation efficiency of the parameter value becomes a decisive factor for the implementing efficiency of the whole key exchange protocol.

Based on provisions of the SM2 key exchange protocol, the existing key negotiation procedure is as follows:

It is supposed that a user A is a key negotiation initiator, a user B is a key negotiation responder, the length of key data obtained through the negotiation between the user A and the user B is klen bits, and both the user A and the user B use the same elliptic curve equation, wherein the elliptic curve equation type can be selected from a prime field equation $y^2=x^3+ax+b$ or a quadratic extension field equation $y^2+xy=x^3+ax^2+b$.

A key derivation function specified in the SM2 key exchange protocol is recorded as KDF(Z,klen), which is used for deriving key data from a secret bit string, wherein Z is an input secret bit string; the integer klen represents the bit length of the key data to be obtained and the value thereof is required to be smaller than $(2^{32}-1)v$; and the bit string of the key data having a length of klen is recorded as K. In the process of generating the key data, the key derivation function needs to call a cryptographic hash function (e.g., SM3 cryptographic hash algorithm), and generally, the cryptographic hash function is recorded as $H_v(\ )$, and the output of the cryptographic hash function is a hash value having a length of v bits.

Operation steps of the key derivation function will be introduced below:

(1) Initializing a counter composed of 32 bits ct=0x00000001;

(2) Executing the following step a and step b circularly by adopting values of i from 1 to $\lceil klen/v \rceil$ respectively, wherein execution results of respective times are respectively recorded as $Ha_1, Ha_2 \ldots Ha_{\lceil klen/v \rceil - 1}$ and $Ha!_{\lceil klen/v \rceil}$, and $Ha!_{\lceil klen/v \rceil}$ is a part or all of the value of the last generated $H_{ai}$:

a, calculating $H_{ai}=H_v(Z\|ct)$, wherein $\|$ is cascade operation;

b, Ct++;

In the process of calculating $Ha!_{\lceil klen/v \rceil}$, is an integer, then let $Ha!_{\lceil klen/v \rceil}=Ha_{\lceil klen/v \rceil}$; and if klen/v is not an integer, then let $Ha!_{\lceil klen/v \rceil}$ be the leftmost $(klen-(v \times \lfloor klen/v \rfloor))$ bits in $Ha_{\lceil klen/v \rceil}$.

(3) Finally, making $K=Ha_1\|Ha_2\| \ldots \|Ha_{\lceil klen/v \rceil - 1}\|Ha!_{\lceil klen/v \rceil}$, wherein K is the obtained key data.

Based on the obtained key derivation function, the user A and the user B need to perform key negotiation in order to obtain the same key, and specific operation steps are as follows:

Recording $w=\lceil (\lceil \log_2(n) \rceil)/2 \rceil - 1$.

User A:

A1: generating a random number $r_A \in [1, n-1]$ by using a random number generator;

A2: calculating an elliptic curve point $R_A=[r_A]G=(x_1, y_1)$, wherein $(x_1, y_1)$ are coordinate values of the point $R_A$, and G is a selected elliptic curve parameter.

A3: sending $R_A$ to the user B;

User B:

B1: generating a random number $r_B \in [1, n-1]$ by using a random number generator;

B2: calculating an elliptic curve point $R_B=[r_B]G=(x_2, y_2)$, wherein $(x_2, y_2)$ are coordinate values of the point $R_B$, and G is a selected elliptic curve parameter;

B3: extracting a field element $x_2$ from $R_B$, converting the data type of the field element $x_2$ into an integer firstly if the field element $x_2$ is quadratic extension field data or directly performing subsequent operations without conversion if the field element $x_2$ is prime field data; and then calculating an intermediate parameter $\overline{x_2}$ at the user B side, wherein $\overline{x_2}=2^w+(x_2 \& (2^w-1))$;

B4: calculating $t_B=(d_B+\overline{x_2} \cdot r_B)$ modn, wherein $t_B$ is an intermediate parameter at the user B side, $d_B$ is a private key stored locally by the user B, and $r_B$ is the random number generated locally by the user B;

B5: verifying whether $R_A$ satisfies an elliptic curve equation (the user B can agree with the user A by using a prime field mode or a quadratic extension field mode in advance that they both adopt the same elliptic curve equation), if not, determining that this key negotiation fails, otherwise extracting a field element $x_1$ from $R_A$, converting the data type of the field element $x_1$ into an integer firstly if the field element $x_1$ is quadratic extension field data or directly performing subsequent operations without conversion if the field element $x_1$ is prime field data, and calculating an intermediate parameter $\overline{x_1}$ at the user B side, wherein $\overline{x_1}=2^w+(x_1 \& (2^w-1))$;

B6: calculating an elliptic curve point $V=[h \cdot t_B](P_A+[\overline{x_1}]R_A)=(x_V, y_V)$, wherein h is a selected elliptic curve parameter, and $P_A$ is a public key of the user A, and judging whether V is an infinite point (e.g., $x_V=0, Y_V=0$), if so, confirming that the key negotiation of the user B fails, otherwise converting the data types of the field elements $x_V$ and $Y_V$ into bit strings;

B7: calculating $K_B=KDF(x_V\|y_V\|Z_A\|Z_B, klen)$, wherein $K_B$ is key data obtained by the user B through the key negotiation, and at this moment, it can be confirmed that the key negotiation of the user B succeeds by default.

Optionally, after executing B7, the user B can further execute B8:

B8: converting the data types of coordinates $x_1$ and $y_1$ of $R_A$ and coordinates $x_2$ and $y_2$ of $R_B$ into bit strings, and calculating $S_B=Hash\ (0x02\|y_V\|Hash(x_V\|Z_A\|Z_B\|x_1\|y_1\|x_2\|y_2))$, wherein Hash( ) can be treated as a cryptographic hash function $H_v(\ )$, and $S_B$ can be treated as a hash value obtained through the operation.

B9: sending $R_B$ to the user A, and if B8 is executed, further sending $S_B$ to the user A;

User A:

A4: extracting the field element $x_1$ from $R_A$, converting the data type of the field element $x_1$ into an integer if the field element $x_1$ is quadratic extension field data or directly performing subsequent operations without conversion if the field element $x_1$ is prime field data, and calculating the intermediate parameter $\overline{x_1}$, wherein $\overline{x_1} = 2^w + (x_1 \& (2^2 - 1))$;

A5: calculating $t_A = (d_A + \overline{x_1} \cdot r_A) \bmod n$, wherein $t_A$ is an intermediate parameter at the user A side, $d_A$ is a private key stored locally by the user A, and $r_A$ is the random number generated locally by the user A;

A6: verifying whether $R_B$ satisfies an elliptic curve equation (agreed with the user B), if not, determining that this key negotiation fails, otherwise extracting the field element $x_2$ from $R_B$, converting the data type of the field element $x_2$ into an integer firstly if the field element $x_2$ is quadratic extension field data or directly performing subsequent operations without conversion if the field element $x_2$ is prime field data, and calculating the intermediate parameter $\overline{x_2}$, wherein $\overline{x_2} = 2^w + (x_2 \& (2^1 - 1))$;

A7: calculating an elliptic curve point $U = [h \cdot t_A](P_B + [\overline{x_2}]R_B) = (x_U, y_U)$, confirming that the negotiation of the user A fails if U is an infinite point (e.g., $x_U = 0$, $y_U = 0$), otherwise converting the data types of the field elements $x_U$ and $y_U$ into bit strings;

A8: calculating $K_A = KDF(x_U \| y_U \| Z_A \| Z_B, klen)$, wherein $K_A$ is key data obtained by the user A through the key negotiation, and at this moment, it can be confirmed that the key negotiation of the user A succeeds by default;

Optionally, after executing A8, the user A can further execute A9 and A10 if receiving $S_B$ sent by the user B:

A9: converting the data types of coordinates $x_1$ and $y_1$ of $R_A$ and coordinates $x_2$ and $y_2$ of $R_B$ into bit strings, and calculating $S_1 = Hash(0x02 \| y_U \| Hash(x_U \| Z_A \| Z_B \| x_1 \| y_1 \| x_2 \| y_2))$, wherein Hash( ) can be treated as a cryptographic hash function $H_v( )$, and $S_1$ can be treated as a hash value obtained through the operation, and checking whether $S_1 = S_B$ is satisfied, if so, determining that the key confirmation from the user B to the user A succeeds, otherwise determining that the key confirmation from the user B to the user A fails;

A10: calculating $S_A = Hash(0x03 1 \| y_U \| Hash(x_U \| Z_A \| Z_B \| x_1 \| y_1 \| x_2 \| y_2))$, and sending $S_A$ to the user B.

User B: (the user B can further execute steps B10 and B11 if receiving $S_A$ sent by the user A)

B10: calculating $S_2 = Hash(0x03 \| y_V \| Hash(x_V \| Z_A \| Z_B \| x_1 \| y_1 \| x_2 \| y_2))$, and checking whether $S_2 = S_A$ is satisfied, if so, determining that the key confirmation from the user A to the user B succeeds, otherwise determining that the key confirmation from the user A to the user B fails.

The above-mentioned process is the key negotiation process described by the SM2 key exchange protocol. It can be seen that in the above-mentioned procedure, the operational formula of the parameter value of W is $w = \lceil (\lceil \log_2(n) \rceil / 2) \rceil - 1$, wherein n is the elliptic curve parameter and also called Order n, and the Order n is generally a big integer containing 160 bits or above. If the logarithm value of $\log_2(n)$ is directly solved based on the Order n and then round-up operation is performed, this is relatively complex during engineering implementation and consumes too much calculating time, thus directly reducing the implementation efficiency of the key negotiation procedure and increasing the implementation complexity of the key negotiation procedure.

SUMMARY OF THE INVENTION

Embodiments of the present invention provide a key negotiation method and apparatus according to the SM2 key exchange protocol so as to reduce the implementation complexity of the key negotiation procedure and increase the implementation efficiency of the key negotiation procedure.

Specific technical solutions according to the embodiments of the present invention are as follows:

A key negotiation method according to the SM2 key exchange protocol includes:

determining a value of an elliptic curve parameter, Order n, used in current key negotiation;

calculating a minimum positive integer value of X when the Order n is smaller than or equal to $2^X$, and obtaining a value of a parameter W based on the obtained minimum positive integer value of X; and performing the key negotiation with an opposite negotiation party based on the value of the parameter W.

A key negotiation apparatus according to the SM2 key exchange protocol includes:

a first control module configured to determine a value of an elliptic curve parameter, Order n, used in current key negotiation, calculate a minimum positive integer value of X when the Order n is smaller than or equal to $2^X$, and obtain a value of a parameter W based on the obtained minimum positive integer value of X; and a second control module configured to perform the key negotiation with an opposite negotiation party based on the value of the parameter W.

A parameter generating apparatus includes:

a determining unit configured to determine a value of an elliptic curve parameter, Order n, used in current key negotiation; and a calculating unit configured to calculate a minimum positive integer value of X when the Order n is smaller than or equal to $2^X$, and obtain a value of a parameter W based on the obtained minimum positive integer value of X.

In the embodiments of the present invention, both parties during negotiation calculate the parameter W according to the minimum positive integer value in the values of X satisfying an inequality $n \leq 2^X$, and perform the key negotiation based on the SM2 key exchange protocol with the opposite negotiation party according to the parameter W. Compared with the method for calculating the parameter W in the manner of calculating the logarithm value of log 2(n) and then rounding up, the present invention effectively decreases the calculated amount and reduces the implementation complexity of the algorithm, thus greatly increasing the implementation efficiency of the key negotiation procedure based on the SM2 key exchange protocol and further optimizing the engineering implementation of the SM2 key exchange protocol.

DETAILED DESCRIPTION OF THE EMBODIMENTS

In the key negotiation process based on the SM2 key exchange protocol, in order to reduce the implementation complexity of the key negotiation procedure and increase the implementation efficiency of the key negotiation procedure, in the embodiments of the present invention, rather than calculating the parameter W through $\lceil \log_2(n) \rceil$, both parties performing the key negotiation calculate the minimum positive integer value of X satisfying $n \leq 2^X$, obtain the value of the parameter W based on the obtained minimum positive integer value of X (for example, the minimum positive integer value of X is substituted into the formula $w=\lceil (\lceil \log_2(n) \rceil/2) \rceil - 1$ instead of the operation result of $\lceil \log_2(n) \rceil$ to calculate the value of W), and then perform the key negotiation with the opposite party based on the value of W calculated in this manner.

Preferred embodiments of the present invention will be illustrated below in details in combination with the accompanying drawings by still taking the user A and the user B as examples.

Figure 1A:
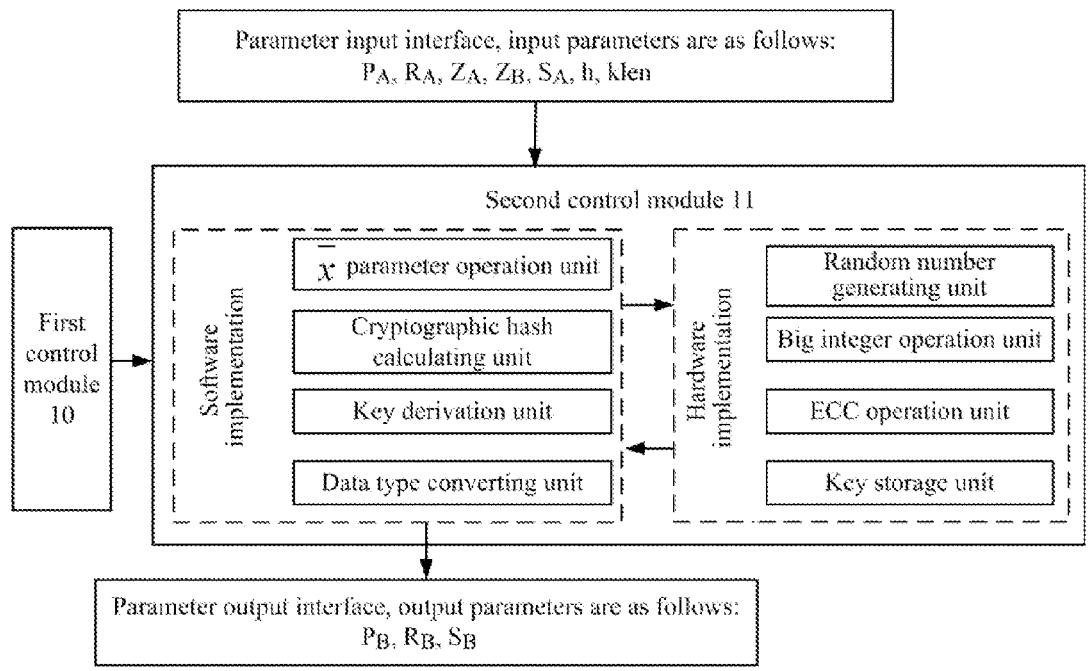
FIG. 1A is a schematic diagram of functional structures of a key negotiation apparatus in an embodiment of the present invention.

Referring to FIG. 1A, in an embodiment of the present invention, a key negotiation apparatus used by either party (the user A or the user B) of two parties during the key negotiation based on the SM2 key exchange protocol includes a first control module 10 and a second control module 11, wherein:

the first control module 10 is configured to determine a value of an elliptic curve parameter, Order n, used in current key negotiation, calculate a minimum positive integer value of X when the Order n is smaller than or equal to $2^X$, and obtain a value of a parameter W based on the obtained minimum positive integer value of X; and the second control module 11 is configured to perform the key negotiation with an opposite negotiation party based on the value of the parameter W.

As shown in FIG. 1A, the interior of the second control module 11 can be further divided into a plurality of functional units implemented in the form of software and functional units implemented in the form of hardware, and the actions of these functional units will be introduced in details in subsequent embodiments; and on the other hand, the division way of the functional units in the second control module 11 shown in FIG. 1A is only an example and can be planned otherwise according to specific application environments in practical applications, which is not redundantly described here.

Figure 1B:
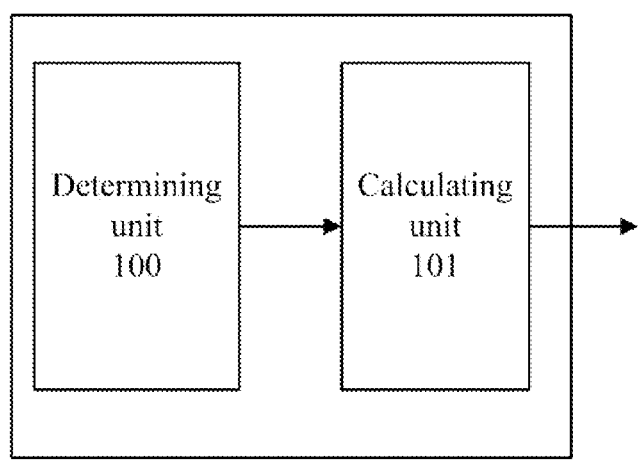
FIG. 1B is a schematic diagram of functional structures of the parameter W generating apparatus in an embodiment of the present invention.

On the other hand, in practical applications, the first control module 10 can be a logic module arranged in the key negotiation apparatus or a sub-apparatus having an independent running function. Referring to FIG. 1B, in an embodiment of the present invention, the first control module 10 includes a determining unit 100 and a calculating unit 101, wherein:

the determining unit 100 is configured to determine the value of the elliptic curve parameter, Order n, used in the current key negotiation; and the calculating unit 101 is configured to calculate the minimum positive integer value of X when the Order n is smaller than or equal to $2^X$, and obtain the value of the parameter W based on the obtained minimum positive integer value of X.

Based on the above-mentioned technical solutions, referring to FIG. 2, in an embodiment of the present invention, the specific procedure executed by either party (the user A or the user B) of the two parties during the SM2 key negotiation is as follows:

Step 200: determining the value of the elliptic curve parameter, Order n, used in current key negotiation.

Generally, the value of the Order n is preset; and in the startup phase of the SM2 key negotiation procedure, the user A and the user B agree on an elliptic curve equation to be adopted and send respective public keys (namely $P_A$ and $P_B$) adopted by themselves to respective opposite parties.

Step 210: calculating the minimum positive integer value of X when the determined Order n is smaller than or equal to $2^X$, i.e., determining the minimum positive integer value of X satisfying an inequality $n \leq 2^X$, and obtaining the value of the parameter W based on the obtained minimum positive integer value of X.

In an embodiment, when the minimum positive integer value of X satisfying the inequality $n \leq 2^X$ is determined, the executed specific operations are as follows: referring to FIG. 3 and FIG. 4, the key negotiation apparatus needs to determine firstly the effective bit number m of the Order n, namely the total number of bits contained in the Order n by counting from the first non-0 bit of high digits; and then compare the value of the Order n with $2^{m-1}$, namely judge whether $n > 2_{m-1}$ is satisfied, if so, directly treat the current value of m as the minimum positive integer value of X; otherwise subtract a set step value (for example, the step value is 1) from m time by time and judge whether $n > 2^{m-1}$ is satisfied once after each subtraction until the inequality is satisfied, and treat the final value of m after subtraction as the minimum positive integer value of X.

Figure 3:
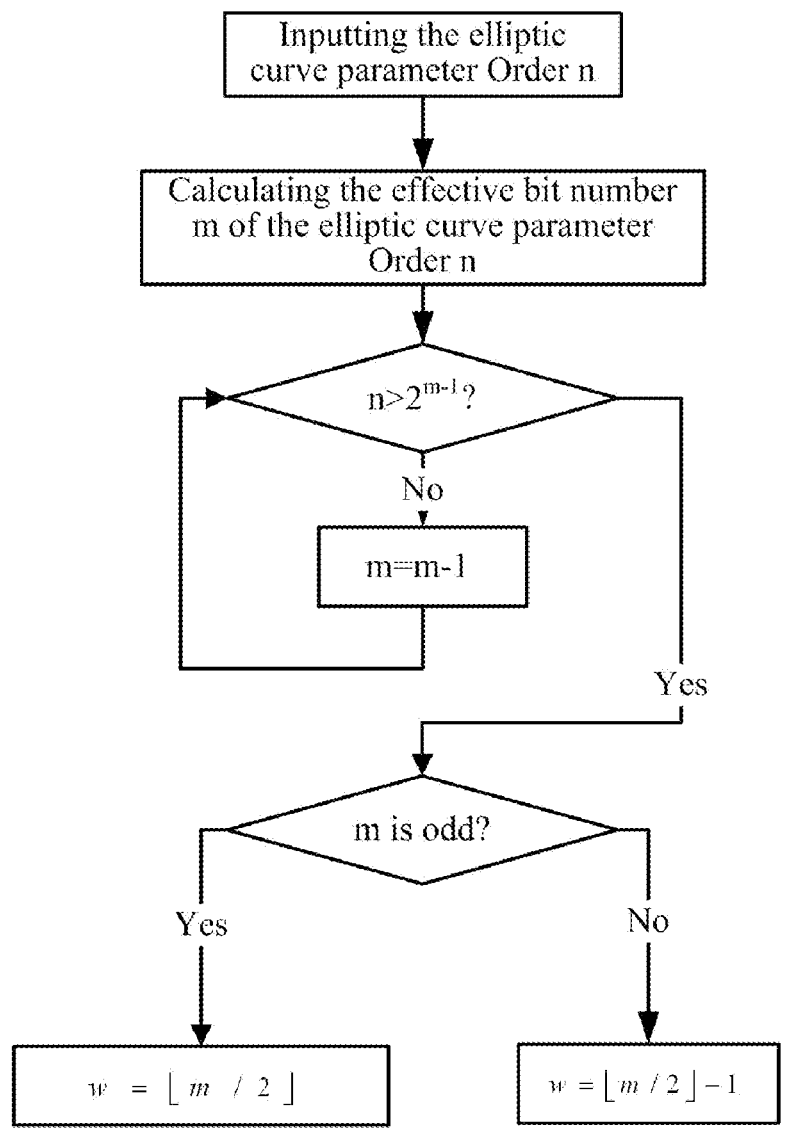
FIG. 3 is a flow chart of a first method for generating the parameter W in an embodiment of the present invention.

In an embodiment, after the minimum positive integer value of X is obtained, the value of the parameter W can be calculated based on the minimum positive integer value of X in multiple manners:

For example, referring to FIG. 3, it can be firstly judged whether the finally obtained m is odd or even (namely whether the minimum positive integer value of X is odd or even); if m is odd, the result obtained through dividing m by a first preset parameter and rounding down is treated as the value of the parameter W, for example, the value of the parameter W is calculated in a formula $w = \lfloor m/2 \rfloor$, wherein $\lfloor \rfloor$ is the round-down operation and m is the minimum positive integer value of X; and if m is even, the result obtained through dividing m by the first preset parameter, rounding down and subtracting a second preset parameter is treated as the value of the parameter W, for example, the value of the parameter W is calculated in a formula $w = \lfloor m/2 \rfloor - 1$, wherein 2 is the first preset parameter and 1 is the second preset parameter.

Figure 4:
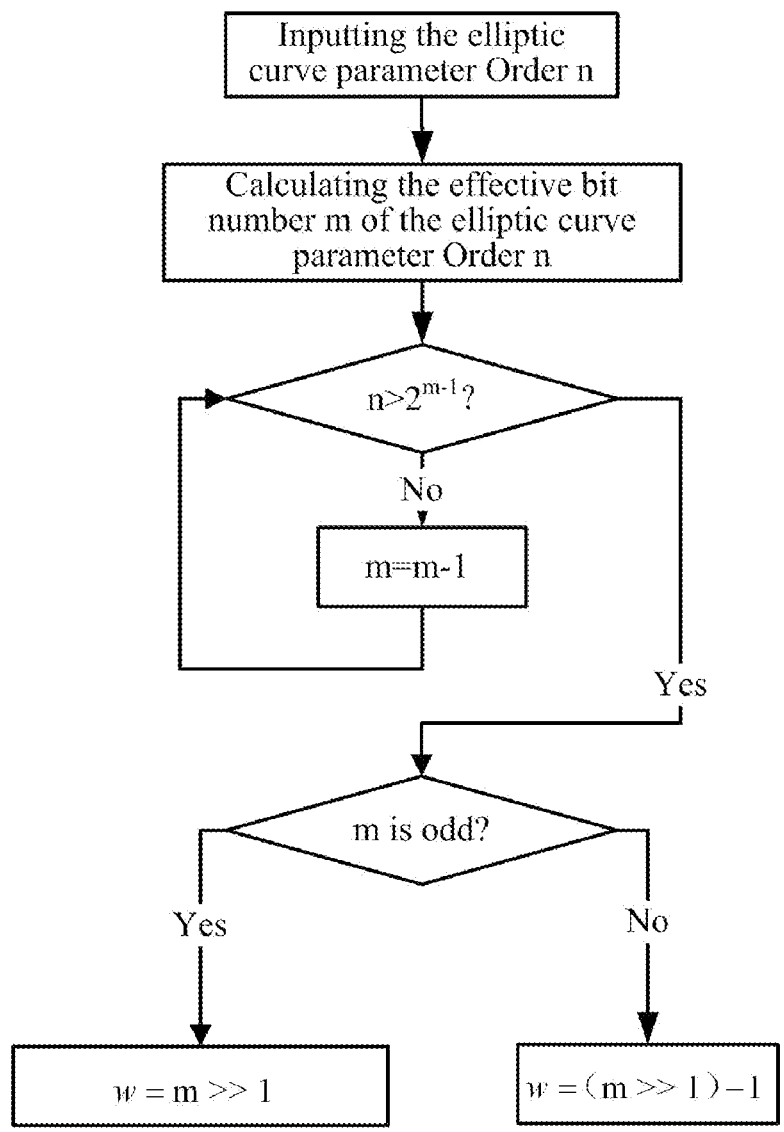
FIG. 4 is a flow chart of a second method for generating the parameter W in an embodiment of the present invention.

For another example, referring to FIG. 4, it can be firstly judged whether the finally obtained m is odd or even (namely whether the minimum positive integer value of X is odd or even); if m is odd, the result obtained through shifting m rightworks by set digits is treated as the value of the parameter W, for example, the value of the parameter W is calculated in a formula $w = m >> 1$, wherein $>>$ is rightward shifting operation, 1 is the number of the set digits for rightward shifting, and $m >> 1$ represents deleting the lowest digit (quadratic extension field form) of the current value of m and then filling zero to the highest digit; and if m is even, the result obtained through shifting m rightwards by set digits and subtracting a third preset parameter is treated as the value of the parameter W, for example, the value of the parameter W is calculated in a formula $w = (m >> 1) - 1$, wherein the first 1 is the number of the set digits for rightward shifting, and the second 1 is the third preset parameter.

Step 220: performing the key negotiation with the opposite negotiation party based on the obtained value of the parameter W.

Figure 2:
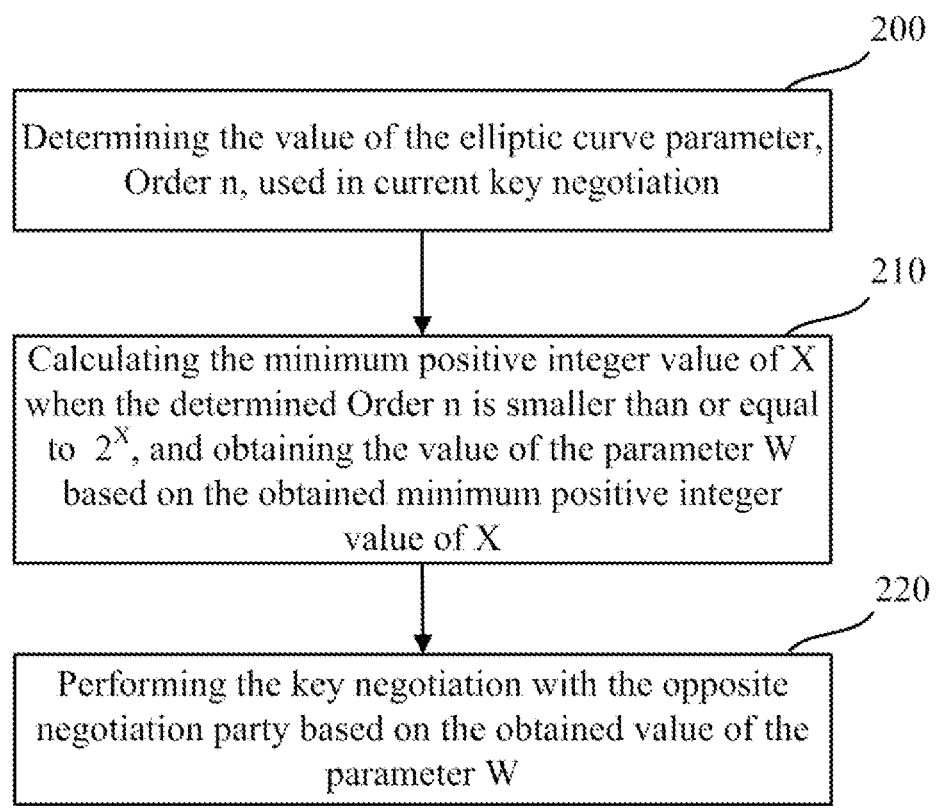
FIG. 2 is a flow chart of performing key negotiation in an embodiment of the present invention.

Referring to FIG. 2, the key negotiation apparatus for implementing the SM2 key exchange protocol can serve as the initiator (the user A) or the responder (the user B), wherein the first control module 10 is an operation module for calculating the parameter W, and the process that the key negotiation apparatus performs the key negotiation with the opposite party after obtaining the parameter W through the first control module 10 is as follows:

After the SM2 key exchange protocol procedure is initialized, the initiator (the user A) and the responder (the user B) respectively obtain the corresponding parameter W through first control modules 10 arranged in key negotiation apparatuses used respectively by them.

Then, the user A calculates a random number and an elliptic curve point through the second control module 11 in the key negotiation apparatus, wherein the second control module 11 can be implemented in a hardware mode. Referring to FIG. 1, the user A can generate a random number $r_A \in [1, n-1]$ through a random number generating unit in the second control module 11, and an ECC operation unit can generate an elliptic curve point $R_A = [r_A]G = (x_1, y_1)$ based on the generated random number; and meanwhile, the second control module 11 takes out a public key $P_A$ corresponding to a private key $d_A$ which is used in the current key negotiation and stored in a key storage sub-module in the key negotiation apparatus, and sends the elliptic curve point $R_A$ and the public key $P_A$ to the user B through a communication interface implemented locally in the form of software.

Information received from the user A by the user B through the key negotiation apparatus B mainly includes: the public key $P_A$ of the opposite party, the elliptic curve point $R_A$ of the opposite party and user information $Z_A$ of the opposite party; and meanwhile, the user B obtains local user information $Z_B$, an elliptic curve cofactor parameter h and an expected length klen of a negotiation key.

The user B calculates a random number and an elliptic curve point through the local second control module 11, wherein the second control module 11 can be implemented in a hardware mode, for example, the user B can generate a random number $r_B \in [1, n-1]$ through a random number generating unit in the second control module 11, and then can generate an elliptic curve point $R_B = [r_B]G = (x_2, y_2)$ based on the generated random number through an ECC operation unit in the second control module 11; and meanwhile, the second control module 11 takes out a public key $P_B$ corresponding to a private key $d_B$ which is used in the current key negotiation and stored in a key storage unit in the key negotiation apparatus, and sends the elliptic curve point $R_B$ and the public key $P_B$ to the user A through a communication interface implemented locally in the form of software.

Next, the user B can convert the data type of the obtained field elements $x_1$ and $x_2$ into the integer data type through a data type converting unit implemented in the form of software in the local second control module 11, and then call a $\overline{x}$ parameter operation unit implemented in the form of software in the second control unit 11 to respectively calculate parameters $\overline{x_1}$ and $\overline{x_2}$ in the formula $\overline{x} = 2^w + (x \& (2^w+1))$ based on the obtained parameter W, wherein $x_1$ is the horizontal coordinate of the elliptic curve point $R_A$, and $X_2$ is the horizontal coordinate of the elliptic curve point $R_B$; and the parameter W generated by adopting the solution according to the embodiments of the present invention is used here.

Next, the user B transmits the public key $P_A$ of the opposite party, the elliptic curve point $R_A$ of the opposite party, the locally adopted elliptic curve cofactor parameter h, the parameter $\overline{x_1}$ and the parameter $\overline{x_2}$ to a hardware implementing part in the second control module 11, and calls a big integer operation unit therein to finish the operation $t_B = (d_B + \overline{x_2} \cdot r_B) \bmod n$, wherein the private key $d_B$ is read out from the key storage unit implemented in the form of hardware in the second control module 11, and related operations mainly include: calculating $l = (\overline{x_2} \cdot r_B) \bmod n$ through the big integer modular multiplication operation and then calculating $t_B = (d_B + l) \bmod n$ through the big integer modular addition operation; and the user B continues calling the above big integer operation unit to finish the operation $f = [h \cdot t_B]$, and the related operation mainly includes the big integer multiplication operation.

Then, the user B verifies whether $R_A$ satisfies the elliptic curve equation through the ECC operation unit implemented in the form of hardware in the second control module 11 and then finishes the operation $V = f(P_A + [\overline{x_1}]R_A) = (x_V, y_V)$, where related operations mainly include: calculating $s = [\overline{x_1}]R_A$ through the ECC point multiplication operation, calculating $g = P_A + s$ through the ECC point addition operation, and then calculating $V = f \cdot g = (x_V, y_V)$ through the ECC point multiplication operation again.

The user B transmits the verification result whether $R_A$ satisfies the elliptic curve equation and the elliptic curve point $V = (x_V, y_V)$ to a software implementing part through the second control module 11 in the key negotiation apparatus. If $R_A$ does not satisfy the elliptic curve equation or $V = (x_V, y_V)$ is an infinite point of the elliptic curve, the operation ends; otherwise, the user B converts the data type of the horizontal coordinate $x_V$ and the vertical coordinate $y_V$ in the elliptic curve point $V = (x_V, y_V)$ into the bit string data type through the data type converting unit implemented in the form of software in the second control module 11, and the user B calculates the local negotiation key $K_B = KDF(x_V \| y_V \| Z_A \| Z_B, \text{klen})$ of the user B through a key derivation unit implemented in the form of software in the second control module 11. So far the user B can confirm that the key negotiation succeeds by default.

Of course, optionally, the user B can further convert the data type of the horizontal coordinate $x_1$ and the vertical coordinate $y_1$ of the elliptic curve point $R_A = (x_1, y_1)$ and the horizontal coordinate $x_2$ and the vertical coordinate $y_2$ of the elliptic curve point $R_B = (x_2, y_2)$ into the bit string data type through the data type converting unit implemented in the form of software in the second control module 11, and then calculate the following checking information through a cryptographic hash calculating unit implemented in the form of software in the second control module 11:

$$S_B = \text{Hash}(0x02 \| y_V \| \text{Hash}(x_V \| Z_A \| Z_B \| x_1 \| y_1 \| x_2 \| y_2))$$

$$S_2 = \text{Hash}(0x03 \| y_V \| \text{Hash}(x_V \| Z_A \| Z_B \| x_1 \| y_1 \| x_2 \| y_2))$$

The user B transmits the checking information $S_B$ to the user A through a transmission interface in the form of software.

The key negotiation apparatus belonging to the initiator A receives the information sent by the user B, obtains the public key $P_B$ of the user B, the elliptic curve point $R_B$ of the user B and the user information $Z_B$ of the user B, and obtains the local user information $Z_A$, an elliptic curve cofactor parameter h and an expected length klen of a negotiation key; and then, the following calculation is performed through the same procedure as the user B:

$$K_A = KDF(x_U \| y_U \| Z_A \| Z_B, \text{klen})$$

So far the initiator A can also confirm that the key negotiation succeeds by default.

Further, if receiving the checking information $S_B$ sent by the user B, the user A also needs to calculate the following verification information through the same procedure:

$$S_1 = \text{Hash}(0x02 \| y_U \| \text{Hash}(x_U \| Z_A \| A_B \| x_y \| y_1 \| x_2 \| y_2))$$

$$S_A = \text{Hash}(0x03 \| y_U \| \text{Hash}(x_U \| Z_A \| Z_B \| x_1 \| y_1 \| x_2 \| y_2))$$

Then the user A checks whether $S_1$ is equal to $S_B$, if so, confirms that the key negotiation succeeds; otherwise, confirms that the key negotiation fails, and sends $S_A$ to the user B.

The user B verifies whether $S_A$ is equal to $S_2$, if so, confirms that the key negotiation succeeds; otherwise, confirms that the key negotiation fails.

So far the SM2 key negotiation procedure established in the SM2 key exchange protocol ends completely.

To sum up, in the embodiments of the present invention, both parties during negotiation calculate the parameter W according to the minimum positive integer value in the values of X satisfying an inequality $n \leq 2^X$, and perform the key negotiation based on the SM2 key exchange protocol with the opposite negotiation party according to the parameter W, wherein the calculating process of the parameter W can be executed before or after the initialization of the actual negotiation procedure, and the identical effect can be achieved. Compared with the method for calculating the parameter W in the manner of calculating the logarithm value of log 2(n) and then rounding up, the present invention effectively decreases the calculated amount and reduces the implementation complexity of the algorithm, thus greatly increasing the implementation efficiency of the key negotiation procedure based on the SM2 key exchange protocol and further optimizing the engineering implementation of the SM2 key exchange protocol.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore, the invention can be embodied in the form of a computer program product embodied in one or more computer useable storage mediums (including but not limited to a disk memory, a CD-ROM, an optical memory, etc.) in which computer useable program codes are contained.

The invention has been described with reference to flow charts and/or block diagrams of the method, the device (system) and the computer program product according to the embodiments of the invention. It shall be appreciated that respective flows and/or blocks in the flow charts and/or the block diagrams and combinations of the flows and/or the blocks in the flow charts and/or the block diagrams can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow charts and/or the block(s) of the block diagrams.

These computer program instructions can also be stored into a computer readable memory capable of directing the computer or the other programmable data processing device to operate in a specific manner so that the instructions stored in the computer readable memory create manufactures including instruction means which perform the functions specified in the flow(s) of the flow charts and/or the block(s) of the block diagrams.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow charts and/or the block(s) of the block diagrams.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as these modifications and variations come into the scope of the claims appended to the invention and their equivalents.

The invention claimed is:

1. A key negotiation method according to an SM2 key exchange protocol, comprising:
   a key negotiation apparatus determining a value of an elliptic curve parameter, Order n, used in current key negotiation; and
   the key negotiation apparatus calculating a minimum positive integer value of X when the Order n is smaller than or equal to $2^X$, and obtaining a value of a parameter W based on the obtained minimum positive integer value of X;
   wherein the key negotiation apparatus performs the key negotiation with an opposite negotiation party based on the value of the parameter W; and
   the key negotiation apparatus comprises a transmitter that transmits messages and a receiver that receives messages to communicate with said opposite negotiation party for key negotiation.

2. The method of claim 1, wherein the step of calculating the minimum positive integer value of X when the Order n is smaller than or equal to $2^X$ comprises:
   obtaining an effective bit number m of the Order n; and
   judging whether the value of the Order n is larger than a value of $2^{m-1}$, if so, directly treating a current value of m as the minimum positive integer value of X; otherwise subtracting a set step value from m time by time, and comparing the value of the Order n with a value of $2^{m-1}$ once after each subtraction until the former is larger than the latter, and treating a final value of m as the minimum positive integer value of X.

3. The method of claim 1, wherein the step of obtaining the value of the parameter W based on the obtained minimum positive integer value of X comprises:
   judging whether the minimum positive integer value of X is odd or even, if it is odd, treating a result obtained through dividing the minimum positive integer value of X by a first preset parameter and rounding down as the value of the parameter W; and if it is even, treating a result obtained through dividing the minimum positive integer value of X by the first preset parameter, rounding down and subtracting a second preset parameter as the value of the parameter W.

4. The method of claim 1, wherein the step of obtaining the value of the parameter W based on the obtained minimum positive integer value of X comprises:
   judging whether the minimum positive integer value of X is odd or even, if it is odd, treating a result obtained through shifting the minimum positive integer value of X rightwards by set digits as the value of the parameter W; and if it is even, treating a result obtained through shifting the minimum positive integer value of X rightwards by set digits and subtracting a third preset parameter as the value of the parameter W.

5. The method of claim 1, wherein the step of performing the key negotiation with the opposite negotiation party based on the value of the parameter W comprises:
  receiving a public key $P_A$ of the opposite party, an elliptic curve point $R_A$ of the opposite party and user information $Z_A$ of the opposite party sent by the opposite negotiation party, and obtaining local user information $Z_B$, a local private key $d_B$, a locally generated random number $r_B$, a locally generated elliptic curve point $R_B$, a local elliptic curve cofactor parameter h and an expected length klen of a negotiation key;
  generating, based on the obtained parameter W, corresponding parameters $\overline{x_1}$ and $\overline{x_2}$ respectively according to a horizontal coordinate $x_1$ of the elliptic curve point $R_A$ and a horizontal coordinate $x_2$ of the elliptic curve point $R_B$ in a manner specified by the SM2 key exchange protocol;
  generating an elliptic curve point V according to the local elliptic curve cofactor parameter h, the local private key $d_B$, the parameters $\overline{x_1}$ and $\overline{x_2}$, the public key $P_A$ of the opposite party, the elliptic curve point $R_A$ of the opposite party and the locally generated random number $r_B$ in a manner specified by the SM2 key exchange protocol, wherein coordinate values of the elliptic curve point V are $(x_V, y_V)$; and
  generating a local negotiation key $K_B$ according to a horizontal coordinate $x_V$ and a vertical coordinate $y_V$ of the elliptic curve point V, the user information $Z_A$ of the opposite party, the local user information $Z_B$ and the expected length klen of the negotiation key in a manner specified by the SM2 key exchange protocol.

6. The method of claim 5, wherein after generating the local negotiation key $K_B$, the method comprises:
  confirming that the key negotiation with the opposite negotiation party succeeds by default; or
  calculating verification information $S_B$ and verification information $S_2$ according to the horizontal coordinate $x_V$ and the vertical coordinate $y_V$ of the elliptic curve point V, the horizontal coordinate $x_1$ and a vertical coordinate $y_1$ of the elliptic curve point $R_A$, the horizontal coordinate $x_2$ and a vertical coordinate $y_2$ of the elliptic curve point $R_B$, the user information $Z_A$ of the opposite party and the local user information $Z_B$ in a manner specified by the SM2 key exchange protocol, and sending the verification information $S_B$ to the opposite negotiation party, wherein the opposite negotiation party generates verification information $S_A$ and verification information $S_1$ in the same manner after receiving the verification information $S_B$ and determines that the key negotiation from the locality to the opposite negotiation party succeeds when confirming that $S_B$ is equal to $S_1$, and receiving the verification information $S_A$ sent by the opposite negotiation party, and determining that the key negotiation from the opposite negotiation party to the locality succeeds when confirming that $S_A$ is equal to $S_2$.

7. A key negotiation apparatus according to an SM2 key exchange protocol, comprising:
  a first control module configured to determine a value of an elliptic curve parameter, Order n, used in current key negotiation, calculate a minimum positive integer value of X when the Order n is smaller than or equal to $2^X$, and obtain a value of a parameter W based on the obtained minimum positive integer value of X;
  a second control module configured to perform the key negotiation with an opposite negotiation party based on the value of the parameter W; and
  a transmitter that transmits messages and a receiver that receives messages.

8. The apparatus of claim 7, wherein while calculating the minimum positive integer value of X when the Order n is smaller than or equal to $2^X$, the first control module obtains an effective bit number m of the Order n; judges whether the value of the Order n is larger than a value of $2^{m-1}$, if so, directly treats a current value of m as the minimum positive integer value of X; otherwise subtracts a set step value from m time by time, and compares the value of the Order n with a value of $2^{m-1}$ once after each subtraction until the former is larger than the latter, and treats a final value of m as the minimum positive integer value of X.

9. The apparatus of claim 7, wherein when obtaining the value of the parameter W based on the obtained minimum positive integer value of X, the first control module judges whether the minimum positive integer value of X is odd or even, if it is odd, treats a result obtained through dividing the minimum positive integer value of X by a first preset parameter and rounding down as the value of the parameter W; and if it is even, treats a result obtained through dividing the minimum positive integer value of X by the first preset parameter, rounding down and subtracting a second preset parameter as the value of the parameter W.

10. The apparatus of claim 7, wherein when obtaining the value of the parameter W based on the obtained minimum positive integer value of X, the first control module judges whether the minimum positive integer value of X is odd or even, if it is odd, treats a result obtained through shifting the minimum positive integer value of X rightwards by set digits as the value of the parameter W; and if it is even, treats a result obtained through shifting the minimum positive integer value of X rightwards by set digits and subtracting a third preset parameter as the value of the parameter W.

11. The apparatus of claim 7, wherein when performing the key negotiation with the opposite negotiation party based on the value of the parameter W, the second control module executes the following operations:
  receiving a public key $P_A$ of the opposite party, an elliptic curve point $R_A$ of the opposite party and user information $Z_A$ of the opposite party sent by the opposite negotiation party, and obtaining local user information $Z_B$, a local private key $d_B$, a locally generated random number $r_B$, a locally generated elliptic curve point $R_B$, a local elliptic curve cofactor parameter h and an expected length klen of a negotiation key;
  generating, based on the obtained parameter W, corresponding parameters $\overline{x_1}$ and $\overline{x_2}$ respectively according to a horizontal coordinate $x_1$ of the elliptic curve point $R_A$ and a horizontal coordinate $x_2$ of the elliptic curve point $R_B$ in a manner specified by the SM2 key exchange protocol;
  generating an elliptic curve point V according to the local elliptic curve cofactor parameter h, the local private key $d_B$, the parameters $\overline{x_1}$ and $\overline{x_2}$, the public key $P_A$ of the opposite party, the elliptic curve point $R_A$ of the opposite party and the locally generated random number $r_B$ in a manner specified by the SM2 key exchange protocol, wherein coordinate values of the elliptic curve point V are $(x_V, y_V)$; and
  generating a local negotiation key $K_B$ according to a horizontal coordinate $x_V$ and a vertical coordinate $y_V$ of the elliptic curve point V, the user information $Z_A$ of the opposite party, the local user information $Z_B$ and the expected length klen of the negotiation key in a manner specified by the SM2 key exchange protocol.

12. The apparatus of claim 11, wherein after generating the local negotiation key $K_B$, the first control module confirms that the key negotiation with the opposite negotiation party succeeds by default; or calculates verification information $S_B$ and verification information $S_2$ according to the horizontal coordinate $x_V$ and the vertical coordinate $y_V$ of the elliptic curve point V, the horizontal coordinate $x_1$ and a vertical coordinate $y_1$ of the elliptic curve point $R_A$, the horizontal coordinate $x_2$ and a vertical coordinate $y_2$ of the elliptic curve point $R_B$, the user information $Z_A$ of the opposite party and the local user information $Z_B$ in a manner specified by the SM2 key exchange protocol, and sends the verification information $S_B$ to the opposite negotiation party, wherein the opposite negotiation party generates verification information $S_A$ and verification information $S_1$ in the same manner after receiving the verification information $S_B$ and determines that the key negotiation from the locality to the opposite negotiation party succeeds when confirming that $S_B$ is equal to $S_1$; and receives the verification information $S_A$ sent by the opposite negotiation party, and determines that the key negotiation from the opposite negotiation party to the locality succeeds when confirming that $S_A$ is equal to $S_2$.

13. A parameter generating apparatus, comprising:
a determining unit configured to determine a value of an elliptic curve parameter, Order n, used in current key negotiation;
a calculating unit configured to calculate a minimum positive integer value of X when the Order n is smaller than or equal to $2^X$, and obtain a value of a parameter W based on the obtained minimum positive integer value of X; and
a processor or a chip that calculates the minimum positive integer value of X.

14. The apparatus of claim 13, wherein while calculating the minimum positive integer value of X when the Order n is smaller than or equal to $2^X$, the calculating unit obtains an effective bit number m of the Order n; judges whether the value of the Order n is larger than a value of $2^{m-1}$, if so, directly treats a current value of m as the minimum positive integer value of X; otherwise subtracts a set step value from m time by time, and compares the value of the Order n with a value of $2^{m-1}$ once after each subtraction until the former is larger than the latter, and treats a final value of m as the minimum positive integer value of X.

15. The apparatus of claim 13, wherein when obtaining the value of the parameter W based on the obtained minimum positive integer value of X, the calculating unit judges whether the minimum positive integer value of X is odd or even, if it is odd, treats a result obtained through dividing the minimum positive integer value of X by a first preset parameter and rounding down as the value of the parameter W; and if it is even, treats a result obtained through dividing the minimum positive integer value of X by the first preset parameter, rounding down and subtracting a second preset parameter as the value of the parameter W.

16. The apparatus of claim 13, wherein when obtaining the value of the parameter W based on the obtained minimum positive integer value of X, the calculating unit judges whether the minimum positive integer value of X is odd or even, if it is odd, treats a result obtained through shifting the minimum positive integer value of X rightwards by set digits as the value of the parameter W; and if it is even, treats a result obtained through shifting the minimum positive integer value of X rightwards by set digits and subtracting a third preset parameter as the value of the parameter W.

* * * * *